Patented July 25, 1933

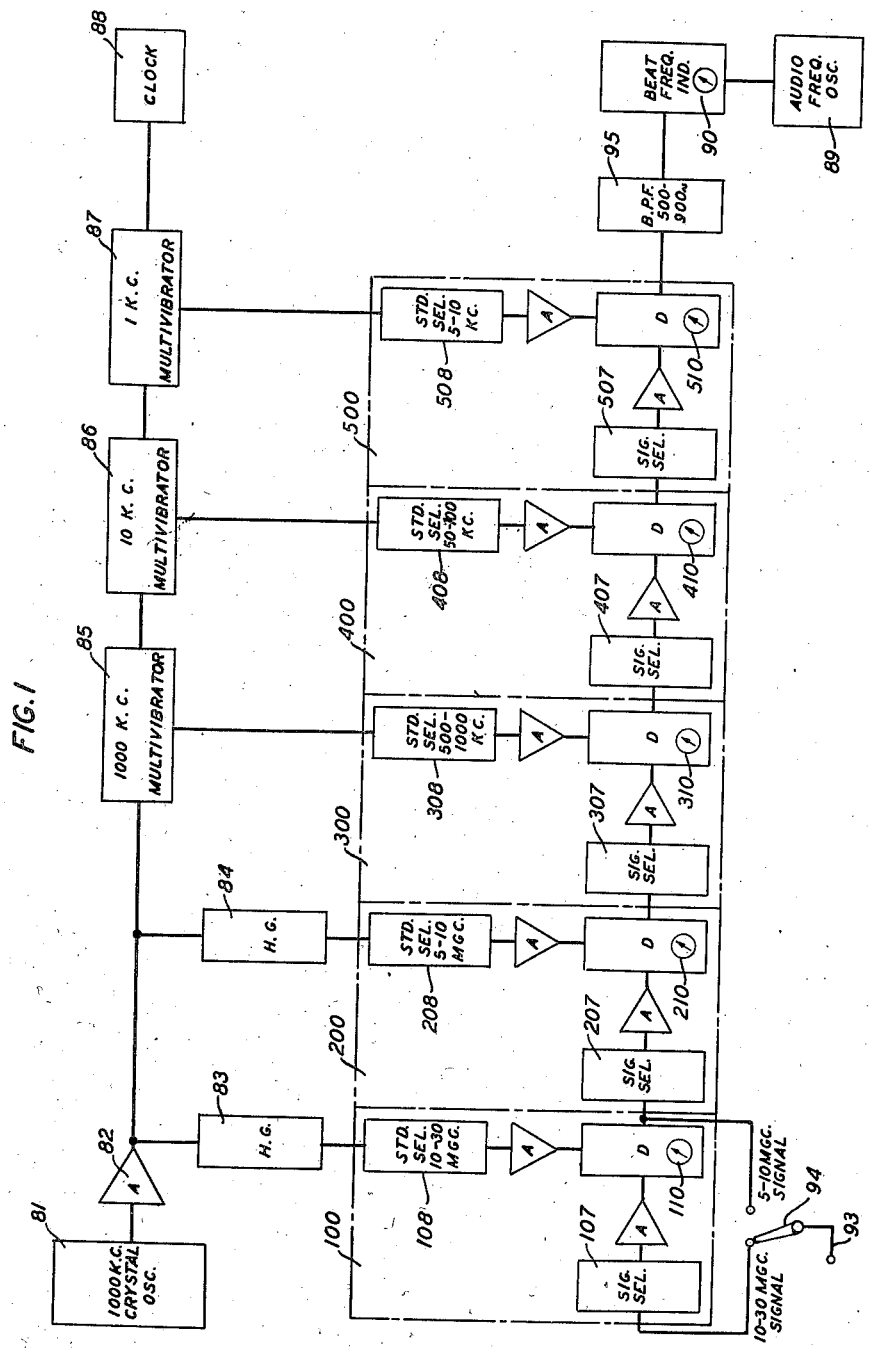

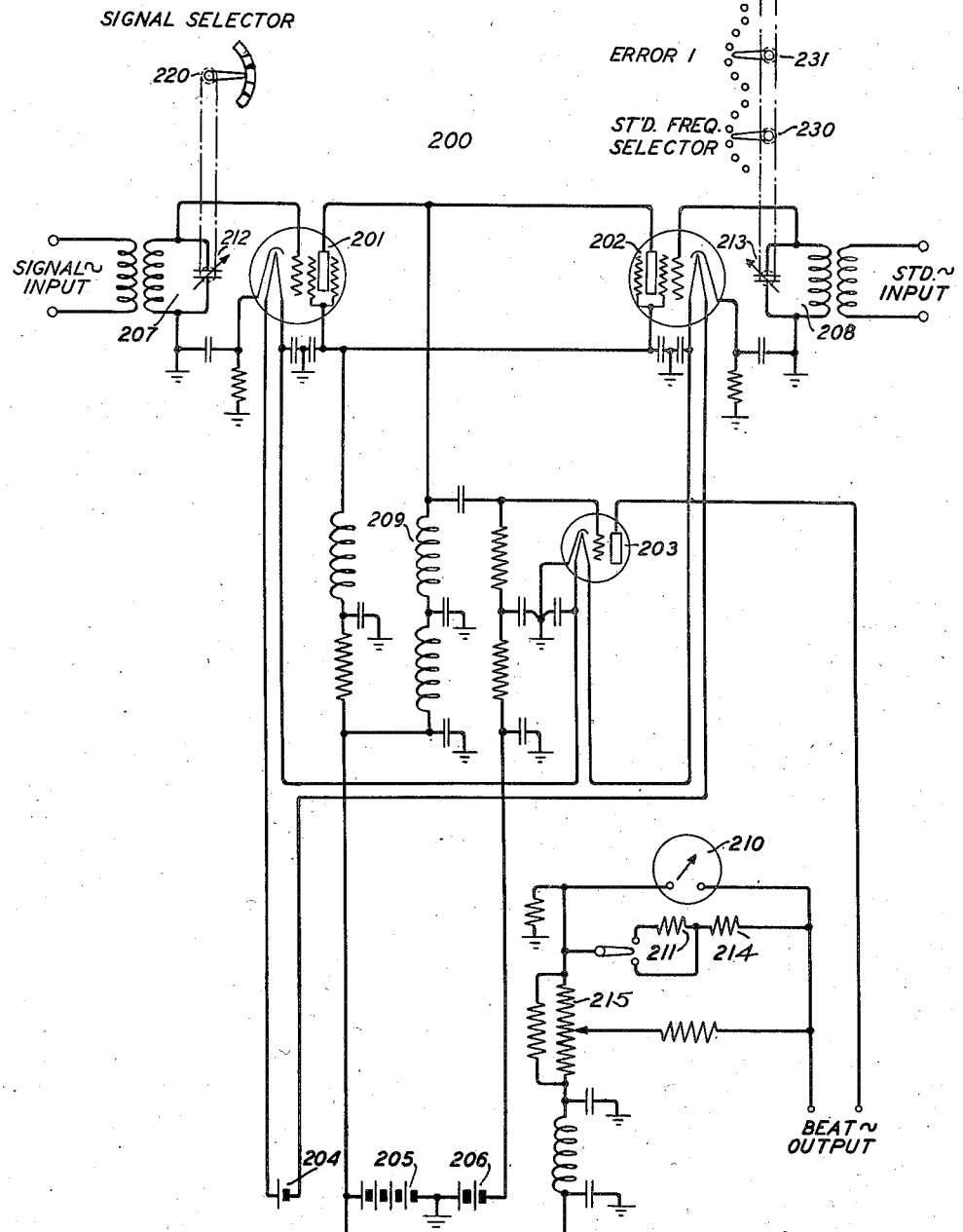

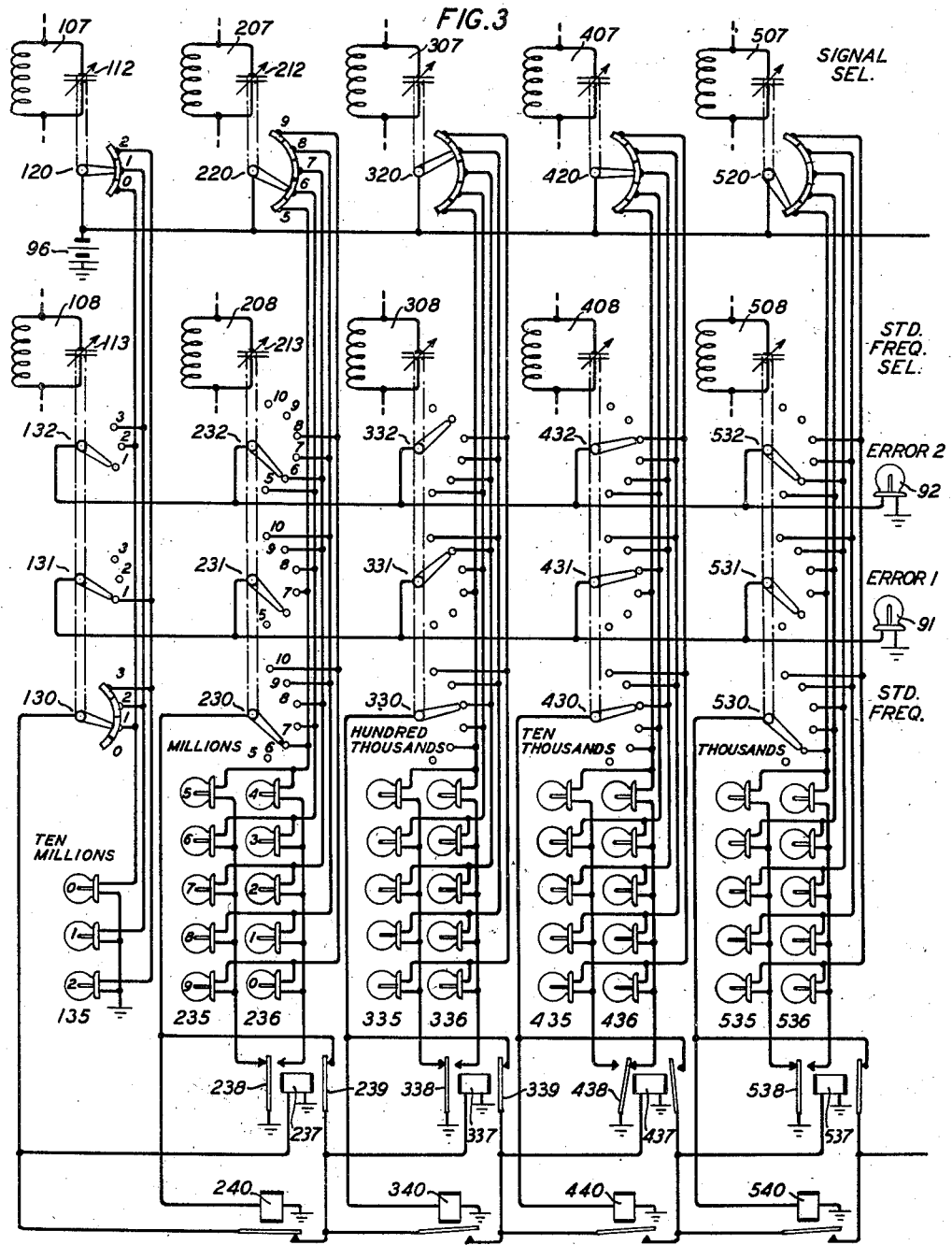

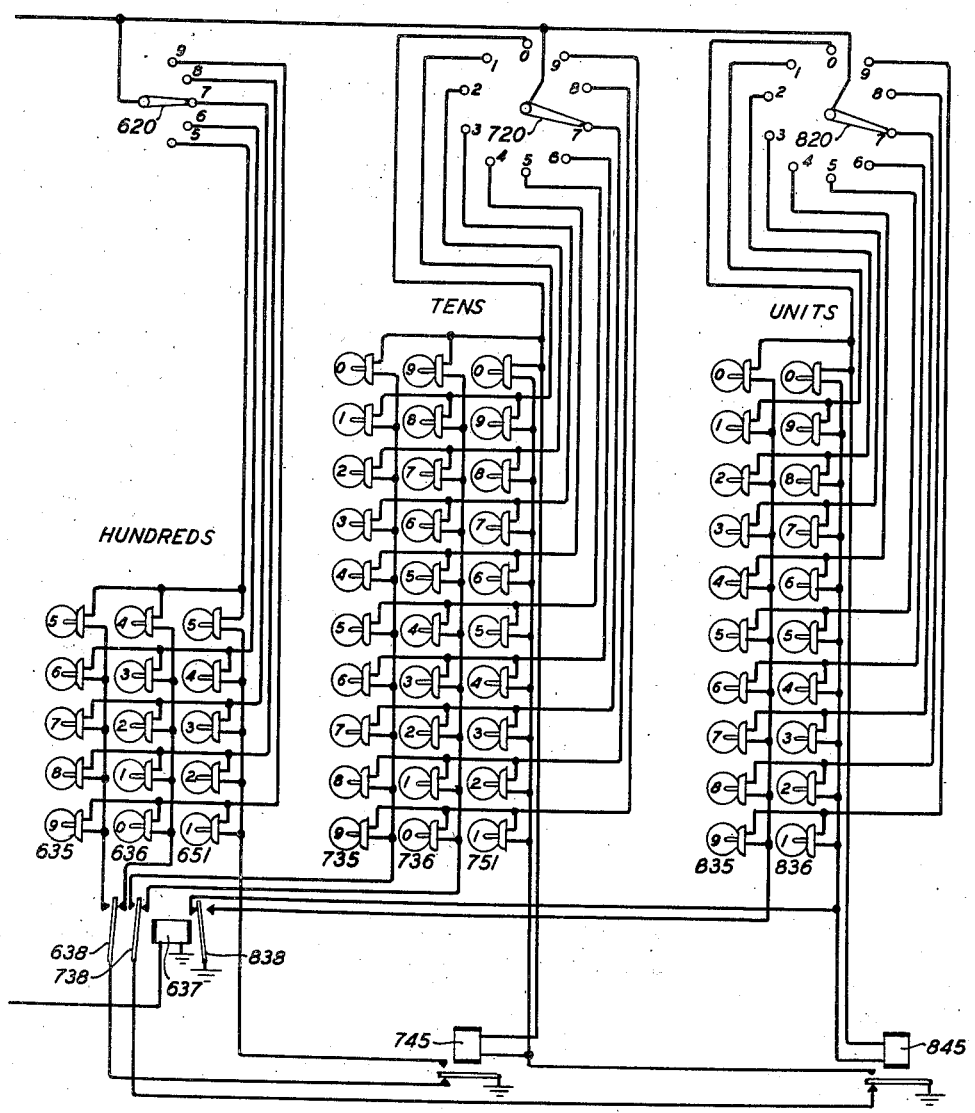

1,919,803

UNITED STATES PATENT OFFICE

ALFRED A. ROETKEN, OF EAST ORANGE, NEW JERSEY, ASSIGNOR TO BELL TELEPHONE LABORATORIES, INCORPORATED, OF NEW YORK, N. Y., A CORPORATION OF NEW YORK

MEASURING AND INDICATING SYSTEM

Application filed March 17, 1931. Serial No. 523,297.

This invention relates to measuring and indicating systems and particularly to frequency measuring systems.

An object of the invention is to simplify the operation of frequency measuring systems.

One type of frequency measuring system which has been found particularly adaptable to the precise measurement of high frequencies is that type in which the wave being measured is successively combined with waves of known frequencies to produce beat frequency waves in successive stages, the frequency of the wave produced in each stage having one less digit than that of the wave in the preceding stage. Obviously, if known frequencies of harmonics from one to ten are employed in each stage, the value of the unknown frequency may be obtained by directly adding the values of the known frequencies supplied. However, to construct such a system, particularly for use at high frequencies, is difficult and impractical because of the range of frequencies which must be covered in each stage of detection and because of the possibility of obtaining more than one beat frequency in the range of each stage.

However, by limiting the beat frequencies generated in any stage to frequencies beginning with one of the numerals 5 to 9 inclusive and making the value of the known heterodyne frequency supplied in each operation an integer followed by zeros, an entirely practical arrangement of apparatus can be obtained. This method of operation not only limits the range which must be covered by the signal selector of each stage to a frequency range of one octave (5 to 9.99 ...) but also limits the standard frequency which must be supplied to each detector stage to a similar range (5 to 10). Further there is only one standard frequency which will produce the beat (difference) frequency which falls in the tuning range of the following detector stage. With such a limitation it is sometimes necessary to use known frequencies the first figure of which is one greater than that of the unknown frequency with which it is beat. Consequently, the value of the unknown frequency cannot be directly obtained by adding together the values of the known frequencies supplied, but must be obtained by single or successive inversions, that is subtractions of the known numbers from some multiple of ten.

A specific object of this invention is to provide a system for automatically and directly indicating the value of the unknown frequency in a frequency measuring system of the type described in the preceding paragraph.

The invention comprises a system of relays and indicating devices controlled by the settings of the calibrated signal selectors and of the calibrated means for indicating the value of the known frequency supplied in each beating stage.

The invention can best be understood by reference to the following detailed description in connection with the drawing in which, Fig. 1 is a block, schematic diagram of a complete frequency measuring system embodying the present invention;

Fig. 2 is a circuit diagram of one amplifier-detector stage of the system of Fig. 1; and Figs. 3 and 4 when placed side by side constitute a circuit diagram of the indicating circuit of the system of Fig. 1.

The specific frequency measuring equipment disclosed herein is designed to measure frequencies between 6000 kilocycles and 30,000 kilocycles. The equipment consists of a one million cycle quartz crystal oscillator 81 as a standard of frequency. Harmonics and subharmonics of this frequency are produced by means of the harmonic generators 83 and 84 and multi-vibrators 85, 86 and 87. The voltages of the known frequency waves produced by these units are combined with a wave supplied to the terminals 93, the frequency of which it is desired to measure in a series of stages by means of the amplifier-detectors 100, 200, 300, 400 and 500. The system is so operated that the beat frequency produced in each stage has one less digit than that of the preceding stage. Furthermore, the modulating frequency in each stage is so chosen that the first figure in each difference frequency wave lies between 5 to 9 inclusive. The demodulating process is repeated until a final beat frequency of three places is obtained, the standard frequency modulating wave employed in each case being of a frequency beginning with a digit followed by zeros. The final beat frequency will lie between 500 and 1000 cycles due to the previously mentioned limitation placed upon the difference frequency number. This three-figure beat frequency is then accurately measured by the zero beat method against the output of an audio frequency oscillator 90 whose frequency range is 500 to 1000 cycles.

The precision of measurement obtainable with this equipment depends primarily upon the constancy of the frequency of the crystal oscillator and the accuracy with which its frequency is known. For determining that latter factor there is provided a clock mechanism 88 which includes a clock driven by a synchronous motor run from a 1000 cycle potential obtained from the multi-vibrator 87, and which can be checked with time signals.

Any of the many well known methods can be used for this purpose. One system which has been found very satisfactory is as follows: Above the face of the clock there is provided a small neon lamp and a slotted disc which are rotated around a circular scale by the clock motor at a speed of one revolution per second. Time signals illuminate the neon lamp and cause a slot to appear at a definite part of the scale upon each revolution giving in conjunction with a sweep second hand a check on the time to 1/20 of a second or better.

A switch 94 is provided so that waves in the 10–30 Mgc. range may be applied to the input of detector-amplifier 100 while those in the 5–10 Mgc. range may be applied to the detector-amplifier 200.

A band pass filter 95 passing waves for frequencies from 500 to 900 cycles is connected between the output of detector-amplifier 500 and the beat frequency indicator 90. This filter is for the purpose of maintaining the output of the detector-amplifier 500 in the required range.

The lines connecting the blocks in the schematic of Fig. 1 represent two wire connections.

A system of reference numerals has been used in which the corresponding apparatus units in each of the detector stages are given the same numbers of the respective hundred ranges, thus 108 is the standard selector of the detector stage 100; 208 that of the stage 200, etc.

Fig. 2 shows the circuit of the amplifier-detector 200 which is representative of all the amplifier-detectors. This circuit comprises two four-electrode vacuum tubes 201, 202 which are operated as tuned circuit, screen grid amplifiers and a three-electrode vacuum tube 203 which is operated as a detector. The necessary operating voltages for the three tubes 201, 202 and 203 are supplied from the batteries 204, 205 and 206.

Resonant selecting circuits 207 and 208 are connected in the grid circuits of the tubes 201 and 202, respectively. The circuit 207 is used for selecting the signal input and circuit 208 for selecting the standard frequency input. The tubes 201 and 202 operate into a common plate inductance 209 which is also connected in the grid circuit of the detector tube 203. A microammeter 210 is connected in the plate circuit of the detector. Two shunt resistances 211 and 214 and a potentiometer 215 provide a circuit for so biasing the normal plate current out of the ammeter as to give a zero reading in the absence of a signal input to the grid of the detector 203.

A commutator and switch mechanism 220 is mounted on the shaft of the movable plates of the tuning condenser 212 of the selector circuit 207. The switch mechanism 220 includes a commutator made up of segments each of which corresponds to one calibrated portion of the tuning range of the circuit 207, thus the first segment will cover the range from 5 to 6 mg.c.; the second from 6 to 7 mg.c. etc. Other commutator switches 230, 231 and 232 are mounted on the shaft of the movable plates of the tuning condenser 213. The contacts of these commutators are adjusted to the positions which the condenser assumes at the calibrated points; i. e., the points where the standard frequencies are tuned in. These commutator switch mechanisms 220, 230, 231 and 232 provide means for operating the frequency indicator shown in Figs. 3 and 4 as described in detail hereinafter.

*Operation*

In measuring the frequency of a wave supplied to the input at 93, the first signal selector 107 is adjusted to tune that circuit to resonance, which condition is indicated by the detector plate meter 110. The dial calibration of the tuning condenser 112 is then read and the dial of the standard frequency selector 108 is set to this same figure and a beat (difference) frequency wave tested for in the detector plate meter 210 of the following stage by running the condenser 212 through its tuning range. If no beat indication is obtained the standard selector condenser 113 is stepped to the next higher calibration point when an indication will be obtained in the detector plate meter 210 showing that the beat frequency wave falls within the tuning range of the signal selector 207.

This operation is continued in succession through the subsequent stages, beat frequency waves replacing the signal waves after the first stage, the heterodyne frequency in each stage being so chosen as to produce a beat which is within the tuning range of the selector of the succeeding stage. The amplitude of the beat frequency waves is adjusted by the control of the voltages of the standard frequency waves.

The beat frequency output of the final amplifier-detector 500 is combined with the waves from the audio-frequency oscillator 89 which is adjusted until a zero beat indication is obtained in the beat frequency indicator 90. The frequency of the signal wave being measured can then be determined from the calibration of the standard and signal frequency selectors and of the audio-frequency oscillator. A typical example follows:

| | Harmonic of 1,000 k.c. oscillator | Condenser | Setting | |
|---|---|---|---|---|
| Signal frequency | | 112 | 1 | 16,825,375 |
| 1st standard frequency | 10 | 113 | 1 | 10,000,000 |
| 1st beat frequency | | 212 | 6 | 6,825,375 |
| 2nd standard frequency | 6 | 213 | 6 | 6,000,000 |
| 2nd beat frequency | | 312 | 8 | 825,375 |
| 3rd standard frequency | 0.9 | 313 | 9 | 900,000 |
| 3rd beat frequency | | 412 | 7 | 74,625 |
| 4th standard frequency | 0.08 | 413 | 8 | 80,000 |
| 4th beat frequency | | 512 | 5 | 5,375 |
| 5th standard frequency | 0.006 | 513 | 6 | 6,000 |
| 5th beat frequency | | | | 625 / 625 |
| Audio-oscillator frequency | | 620 / 720 / 820 | 6 / 2 / 5 | 0 |
| Zero beat | | Meter 90 | | |

Thus it will be seen that by the proper interpretation of the condenser settings the answer can be obtained. Wherever the beat (or signal) frequency has been subtracted from the standard frequency to give the proper beat frequency (i. e. wherever the standard condenser setting is higher than that of the signal condenser) an inversion occurs; that is, the resultant beat frequency no longer contains the same figures which were present in the original signal (or beat) but is a difference number. Hence in obtaining the answer, reinversions must be made wherever a comparison of the signal and standard condenser settings indicates that an inversion has taken place. This process is tedious and conducive of error.

The calculation of the frequency of the wave being measured from the settings of the various condensers is avoided by the use of the frequency indicating system of this invention which is shown in detail in Figs. 3 and 4.

Frequency indicating system

Figs. 3 and 4 when placed side by side show the complete circuit of the frequency indicating system. This system is controlled by the commutators 120, 220, etc. mounted on the shafts of the tuning condensers of the signal selectors and the commutators 130, 230, etc. mounted upon the shafts of the tuning condensers of the standard frequency selectors.

It will be seen from the numerical example given above that when no inversions occur, corresponding signal and standard selector settings are alike, but where inversions do occur, the standard selector dial setting will be one number greater than that of the corresponding signal selector setting. This condition is utilized to energize relays in the positions corresponding to the inversions.

The apparatus and circuits for the indicating equipment for each of the amplifier-detectors 200, 300, 400 and 500 are identical so that that for the stage 200 only will be described in detail. This comprises two groups of indicating lamps 235 and 236. The group 235 corresponds directly to the calibrated settings of the tuning condenser 212 of the signal selector circuit 207. The groups 236 corresponds to the equivalent inverted or difference numbers of these condenser settings.

Since no inversions occur in the first stage 100 there is one group of lamps 135 therefor. This group consists only of three lamps because of the limited range of that stage. One of these lamps corresponds to each of the three positions of the tuning condenser 112.

When the signal selector condenser 212 is stopped at any position, voltage will be supplied from the battery 96 through the arm and corresponding contacts of the commutator 220 to the two corresponding lamps of the groups 235 and 236. The left-hand armature 238 of relay 237 provides a path for completing the circuit for the lamps. The position of the armature 238 and consequently the circuit of which one of the lamps is completed will depend upon the relative settings of the tuning condensers of the selector circuits 107 and 108.

A corresponding condition will exist for the indicating lamps of each of the stages 300, 400 and 500, except that in each of these cases the position of the armatures 338, 438 or 538 will depend upon the relative positions of the tuning condensers of the signal and standard frequency selectors of all of the preceding stages.

Thus it will be seen that when the tuning condensers 112 and 113 are in the same position, the relay 237 will be unoperated and the armature 238 will be in the left-hand position causing the circuit for that one of the group of lamps 235 corresponding directly to the setting of the condenser 212 to be completed.

Assuming an unlike setting of the condensers 112 and 113 (for example, a setting of 1 for the condenser 112 and a setting of 2 for the condenser 113) the winding of the relay 237 will be energized through the circuit completed from the battery 96 through the armature and contact of the commutator 120 and the armature and contact of the commutator 130. Such a condition will result in the completion of the circuit of the lamp of the inverted or difference number group 236.

In the condition in which the two tuning condensers of each of the following amplifier-detector stages 200 to 500 are set alike, the other relays 337, 437 and 537 will also be operated. However, the operating circuit for any of these relays is through the armatures of the No. 40 relays of all of the preceding stages. These relays 240, 340, 440 and 540 are operated by an unlike setting of the tuning condensers of their own stages and operate to produce a reinversion by releasing a No. 37 relay, operated by an unlike setting of the tuning condensers of the preceding stage.

Assuming that the second unlike setting of the tuning dials occurs in the amplifier-detector stage 200, relay 240 will be operated, releasing all the No. 37 relays except relay 237, restoring the indicating lamp circuit to the normal position. Because of the unlike setting of the condensers in the amplifier-detector stage 100, the normal operating circuits for the relays 337, 437 and 537 will be broken at the armature 239 of relay 237.

Similar operations are continued as the selector circuit condensers are adjusted, the correct answer being indicated by the lighted lamp after all amplifier-detector and audio-oscillator adjustments have been made.

The last three selector switches 620, 720 and 820 are set separately to the frequency indicated by the audio-oscillator. Relays 54 and 55 are provided to transfer a ten due to inversion of a zero in one stage to a unit in the preceding stage. This is accomplished by providing in the hundreds and tens indicating stages in addition to the normal and inverted groups of lamps 635, 636, 735 and 736 in each case, a third group of lamps 651 and 751, respectively. This third group of indicating lamps will read one greater than the lamps of the corresponding inverted group 636 or 736.

Since the figures of the hundreds, tens and units stages are all determined by the adjustments of the audio-oscillator, the figures of these last three groups are treated as one number in inversion and are consequently controlled in multiple from the inversion relay 637. This relay is provided with three armatures 638, 738 and 838 which control the inversion of the hundreds, tens and units group of numbers respectively.

When the dial 820 is set in the naught position the relay 845 is operated to complete the circuit of the 751 group of lamps through its armature. The ground connection for the 745 relay is completed to this same circuit so that in the case in which both of the dials 820 and 720 are in the naught position, the circuit for the 651 group of lamps will be completed through the armature of relay 745.

The result of the operations of the relays is that circuits of the inverted numeral indicating lamps Nos. 36 for all stages following a stage having unlike tuning condenser readings are completed and remain so until another set of tuning condensers reads unlike after which the circuits of the direct reading numeral lamps Nos. 35 are restored, etc. This duplicates exactly the series of operations performed arithmetically in the numerical example given above and is accomplished simply by the setting of the condensers.

In the drawings the various elements are shown in the positions which they would occupy in measuring the wave of the numerical example given above.

Commutators No. 31 and No. 32 are provided to control two error lamps 91 and 92. The contacts of the commutators No. 31 are so connected that when the signal selector condenser of any stage is set to read one more than the standard selector condenser of the same stage, the lamp 91 will light. In a similar manner the contacts of the commutators No. 32 are so connected that when the tuning condenser of any signal selector reads two less than the tuning condenser of the corresponding standard frequency selector, the lamp 92 will be lighted.

These error lamps eliminate the possibility of error due to inaccuracies in circuit calibrations and commutator adjustments. They are effective because of the fact that only two improper combinations can occur without the complete loss of the wave being measured. If, at the conclusion of a measurement, either of the error lamps 91 and 92 should be lighted it is only necessary to slightly adjust the signal selector condensers, one at a time, until the error lamp is extinguished.

What is claimed is:

1. In a frequency measuring system, a plurality of beating stages in each of which the wave being measured is combined with a wave of known frequency to produce a beat frequency of one less digit than that of a preceding stage and having as a first digit one of the numerals five, six, seven, eight or nine, each stage comprising a signal selector calibrated to indicate the first digit of the unknown frequency wave supplied to that stage, a standard selector calibrated to indicate the frequency of the known frequency wave supplied to that stage, two series of indicators, one series bearing the numerals five, six, seven, eight and nine respectively and the other series bearing the numerals four, three, two, one and naught, respectively, each indicator of the second series being associated with the corresponding indicator of the first series, an inverting relay, an auxiliary relay, and connections whereby when the inverting relay is in the release position that one of said first series of indicators which corresponds to the setting of the signal selector will be operated and when the inverting relay is in the operated position, the corresponding one of the second series of indicators will be operated, and connections for operating said relays so that the indicators are operated to give directly the frequency of the wave being measured.

2. In a frequency measuring system, a plurality of beating stages in each of which the wave being measured is combined with a wave of known frequency the value of which is an integer followed by zeros, to produce a beat frequency of one less digit than that of the preceding stage and having as a first digit one of the numerals five, six, seven, eight or nine, each stage comprising a signal selector calibrated to indicate the first digit of the unknown frequency wave supplied to that stage, a standard frequency selector calibrated to indicate the frequency of the known frequency wave supplied to that stage, two series of indicators, one series bearing the numerals five, six, seven, eight and nine respectively and the other series bearing the numerals four, three, two, one and naught respectively, each indicator of the second series being associated with the corresponding indicator of the first series, an inverting relay, an auxiliary relay and connections whereby when the inverting relay is in the release position that one of the first series of indicators which corresponds to the setting of the signal selector will be operated and when the inverting relay is in the operated position the corresponding one of the second series of indicators will be operated, an operating path for each inverting relay through a normally closed contact of the inverting relay of the preceding stage, a second operating path for each inverting relay through the normally closed contacts of the auxiliary relays of the preceding stages in series, and connections whereby when the setting of the standard selector of any stage is a digit one greater than that of the setting of the signal selector of that stage, the auxiliary relay of said stage will be operated and said operating paths for the inverting relay will be energized.

3. In a frequency measuring system, a plurality of beating stages in each of which the wave being measured is combined with a wave of known frequency to produce a beat frequency of one less digit than that of the preceding stage and having as a first digit one of the numerals five, six, seven, eight or nine, each stage comprising a signal selector calibrated to indicate the first digit of the unknown frequency wave supplied to that stage, a standard selector calibrated to indicate the frequency of the known frequency wave supplied to that stage, two series of indicators, one series bearing the numerals five, six, seven, eight and nine respectively and the other series bearing the numerals four, three, two, one and naught, respectively, each indicator of the second series being associated with the corresponding indicator of the first series, an inverting relay, an auxiliary relay, and connections whereby when the inverting relay is in the release position that one of said first series of indicators which corresponds to the setting of the signal selector will be operated and when the inverting relay is in the operated position, the corresponding one of the second series of indicators will be operated, connections for operating said relays so that the indicators are operated to give directly the frequency of the wave being measured, means for automatically giving an indication when any signal selector is set to a calibration one more than the calibration of the corresponding standard selector, and means for automatically giving an indication when any signal selector reads two less than the calibrations of the corresponding standard selector.

4. In a frequency measuring system, means for beating the frequency to be measured with waves of known frequencies in successive steps to produce in each step a wave of frequency having one less digit than the wave being beat down and lying in a frequency range not greater than one octave, calibrated selective means for indicating the first integer of the wave being beat down in each step, means for indicating the frequency of the known wave supplied in each step, two series of indicators associated with the beating means of each step subsequent to the first, one of said series representing direct readings and the other of said series representing inverted readings, and means controlled by the relative setting of the calibrated selective means and the known frequency indicating means of a preceding beating step for selecting between the two series of indicators to give a direct indication of the frequency being measured.

5. In a frequency measuring system of the type in which the wave under observation is beat down in a series of steps by being combined with a wave of known frequency of a value which is an integer followed by zeros to produce in each step a wave of frequency of one less digit than the wave being beat down and having a frequency beginning with a digit from 5 to 9, inclusive, calibrated wave selecting means and calibrated known frequency selecting means for each beating step, two series of indicators associated with each step subsequent to the first, one of said steps representing direct readings and the other of said steps representing inverted readings, and means responsive to the relative settings of the two calibrated selecting means of each beating step for controlling the selection of the two series of indicators of subsequent beating steps to give a direct indication of the frequency of the wave being measured.

6. In a frequency measuring system, a plurality of beating stages, in each of which the wave being measured is combined with a wave of known frequency to produce a beat frequency of one less digit than that of the preceding stage and having as a first digit one of the numerals 5, 6, 7, 8 or 9, each stage comprising a signal selector calibrated to indicate the first digit of the unknown wave supplied to that stage, a standard selector calibrated to indicate the frequency of the known wave supplied to that stage, two series of indicators, one series bearing the numerals 5, 6, 7, 8 and 9, respectively, and the other series bearing the numerals 4, 3, 2, 1, and 0, respectively, each indicator of the second series being associated with the corresponding indicator of the first series, means for selecting between said two series of indicators, and means for controlling the indicator selecting means so that the indicators are operated to give directly the frequency of the wave being measured.

ALFRED A. ROETKEN.